United States Patent
Cerreta et al.

(10) Patent No.: US 8,479,591 B2
(45) Date of Patent: Jul. 9, 2013

(54) APPARATUS FOR TESTING FUSELAGE PANELS

(75) Inventors: Pietrantonio Cerreta, Naples (IT); Angela Natale, Seattle, WA (US); Paolo Ruggiero, Mercogliano (IT); Domenico Cozzolino, Caserta (IT)

(73) Assignee: Alenia Aeronautics S.p.A., Pomigliano d'Arco, Naples (IT)

( * ) Notice: Subject to any disclaimer, the term of this patent is extended or adjusted under 35 U.S.C. 154(b) by 282 days.

(21) Appl. No.: 12/643,881

(22) Filed: Dec. 21, 2009

(65) Prior Publication Data
US 2010/0186519 A1   Jul. 29, 2010

(30) Foreign Application Priority Data
Dec. 24, 2008 (IT) .............................. TO2008A0991

(51) Int. Cl.
*G01M 5/00* (2006.01)
*G01N 3/08* (2006.01)
*G01N 3/10* (2006.01)

(52) U.S. Cl.
USPC .................................. 73/802; 73/825; 73/837

(58) Field of Classification Search
USPC ................. 73/818, 841, 802, 49.5–49.6, 825, 73/837
See application file for complete search history.

(56) References Cited

U.S. PATENT DOCUMENTS

| | | | |
|---|---|---|---|
| 2,396,380 A * | 3/1946 | Longley | 73/49.5 |
| 4,061,015 A * | 12/1977 | Fish | 73/49.5 |
| 6,619,104 B1 * | 9/2003 | Yeh | 73/49.6 |
| 7,421,906 B2 * | 9/2008 | Saves-Saint-Germes | 73/802 |
| 7,426,871 B2 * | 9/2008 | Saves-Saint-Germes et al. | 73/802 |
| 7,624,695 B2 * | 12/2009 | Gotze et al. | 114/355 |
| 8,024,981 B2 * | 9/2011 | Hinrichs et al. | 73/802 |
| 2006/0101921 A1 | 5/2006 | Ostgaard et al. | |
| 2007/0022821 A1 * | 2/2007 | Saves-Saint-Germes | 73/802 |
| 2007/0068275 A1 * | 3/2007 | Saves-Saint-Germes | 73/802 |
| 2007/0227434 A1 * | 10/2007 | Gotze et al. | 114/355 |

FOREIGN PATENT DOCUMENTS
EP   1 990 276 A1   11/2008

OTHER PUBLICATIONS

Ambur et al. "Design and Evaluation of Composite Fuselage Panels Subjected to Combined Loading Conditions." *Journal of Aircraft*. vol. 42, No. 4, Jul.-Aug. 2005, pp. 1037-1045.
Langon et al. "Development of a Test Fixture for Fuselage Curved Panels." Proceedings of the ICAF (International Committee on Aeronautical Fatique) Symposium. vol. 2, Jan. 1, 1999, pp. 745-753.
European Search Report mailed on Mar. 3, 2010 for corresponding European Application No. EP 09 17 9795.

* cited by examiner

*Primary Examiner* — Lisa Caputo
*Assistant Examiner* — Jonathan Dunlap
(74) *Attorney, Agent, or Firm* — Merchant & Gould P.C.

(57) ABSTRACT

Gripping claws and pairs of arched angular profiles are arranged along the perimeter of a cylindrical surface segment so as to grip the edges of a fuselage panel, closing the opening of a pressurizable chamber.

8 Claims, 3 Drawing Sheets

APPARATUS FOR TESTING FUSELAGE PANELS

This application claims benefit of Serial No. TO2008A000991, filed 24 Dec. 2008 in Italy and which application is incorporated herein by reference. To the extent appropriate, a claim of priority is made to the above disclosed application.

BACKGROUND OF THE INVENTION

The present invention relates to an apparatus for performing structural tests, such as static tests, fatigue tests and damage tolerance tests, on fuselage panels. The invention is applicable equally well to metal or composite-material panels which may or may not be reinforced with stringers.

Hitherto fuselage sections or "barrels" have been tested by means of apparatus provided with jacks for applying test loads and pressurization apparatus for simulating pressure differences between the inside of the aircraft and the outside. The tests of this type are complicated and costly owing to the size of the barrels, in particular large-diameter barrels, with dimensions of the order of 6 to 10 metres. The operations for mounting and removing said barrels onto/from the testing apparatus are time-consuming and must be performed with great care so as to avoid damaging the barrel. Moreover, a considerable amount of free space is required around the apparatus.

SUMMARY OF THE INVENTION

It is an object of the present invention to provide a testing apparatus able to apply combined stresses to curved fuselage panels of varying sizes. In particular, the aim is to study the behaviour of the panels when subject to simultaneous forces produced by axial (compressive or tensile), shearing, torsional and pressurization loads. Another object of the invention is to reduce the time required for the test operations, so that that they are less costly, and use the same apparatus in order to test panels of varying size and/or radius of curvature, with the need for only minor modifications in order to adapt the apparatus to the panel. Another object of the invention is to optimize the space which is available in the working environment. Yet another object is to provide an apparatus which is able to impart combined stresses employing a small number of actuators.

One or more of the abovementioned objects is/are achieved, according to the present invention, by a testing apparatus having the features set forth in the accompanying claims which form an integral part of the description of the present patent application.

BRIEF DESCRIPTION OF THE DRAWINGS

Further objects, features and advantages of the present invention will emerge clearly from the detailed description below and from the accompanying drawings, provided purely by way of a non-limiting example, in which.

DETAILED DESCRIPTION OF THE PREFERRED EMBODIMENTS

Figure 1:
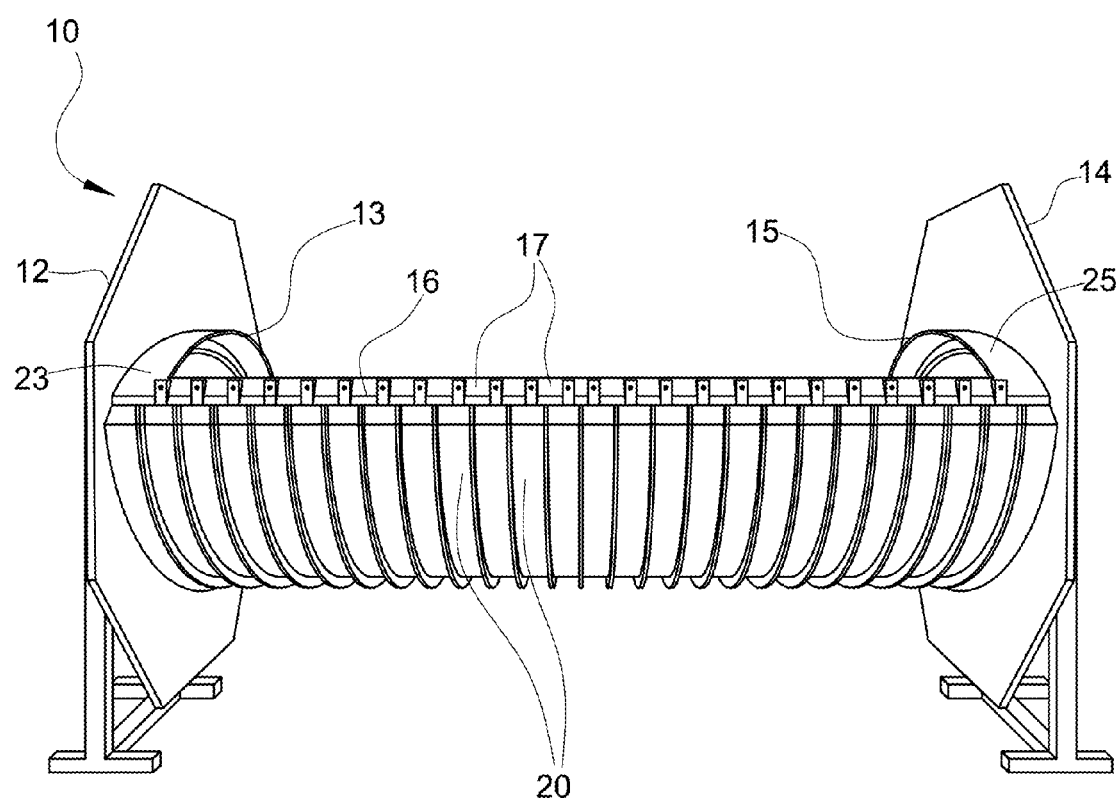
FIG. 1 is a side elevation view of a device for retaining a fuselage panel, forming part of the testing apparatus according to the present invention.

Before illustrating in detail an embodiment of the apparatus according to the invention, it must be remembered that it is not limited, in terms of its application, to the details and the configuration of the components mentioned in the description or illustrated in the drawings. The invention may be implemented in various ways. It must be understood that the phrases and terms which are used here purely for descriptive purposes must not be regarded as limiting. The use of the terms "include", "comprise", "form" and their variants embrace both the parts to which they refer and also equivalent parts.

Figure 5:
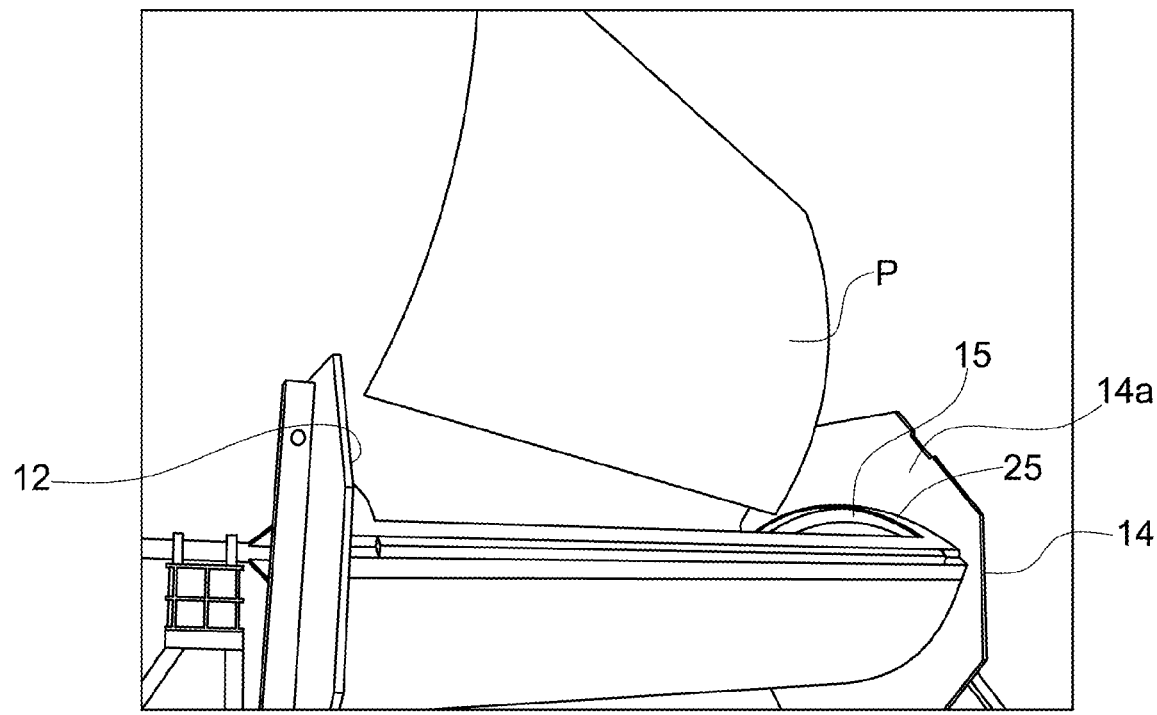
FIG. 5 illustrates a step of the removal of a fuselage panel from the device according to FIGS. 1-4.

With reference initially to FIG. 1, the testing apparatus comprises a retaining device—designated in its entirety by 10—which has a general structure resembling that of a cradle. The device 10 is used to restrain perimetrally a fuselage panel P (visible in FIG. 5) having the shape of a segment or portion of a cylindrical surface. For this purpose, the device 10 provides a plurality of panel restraining members—described in detail further below—which are arranged along the edges of a hypothetical cylindrical segment surface for gripping the edges of the panel during the tests.

The cradle device 10 comprises two parallel vertical plates 12, 14 which in this example have a polygonal shape and between which two parallel longitudinal bars 16, 18 extend. In the present description, terms and expressions such as "longitudinal" and "transverse" are to be understood as referring to a central "fore-aft" axis of a fuselage in which the test panel is to be incorporated. Similarly, terms such as "inner" and "outer" refer respectively to positions which are more or less close to the aforementioned central axis. The plates 12, 14 are therefore oriented in directions which are defined as being "transverse" with respect to the longitudinal direction of the panel.

Figure 2:
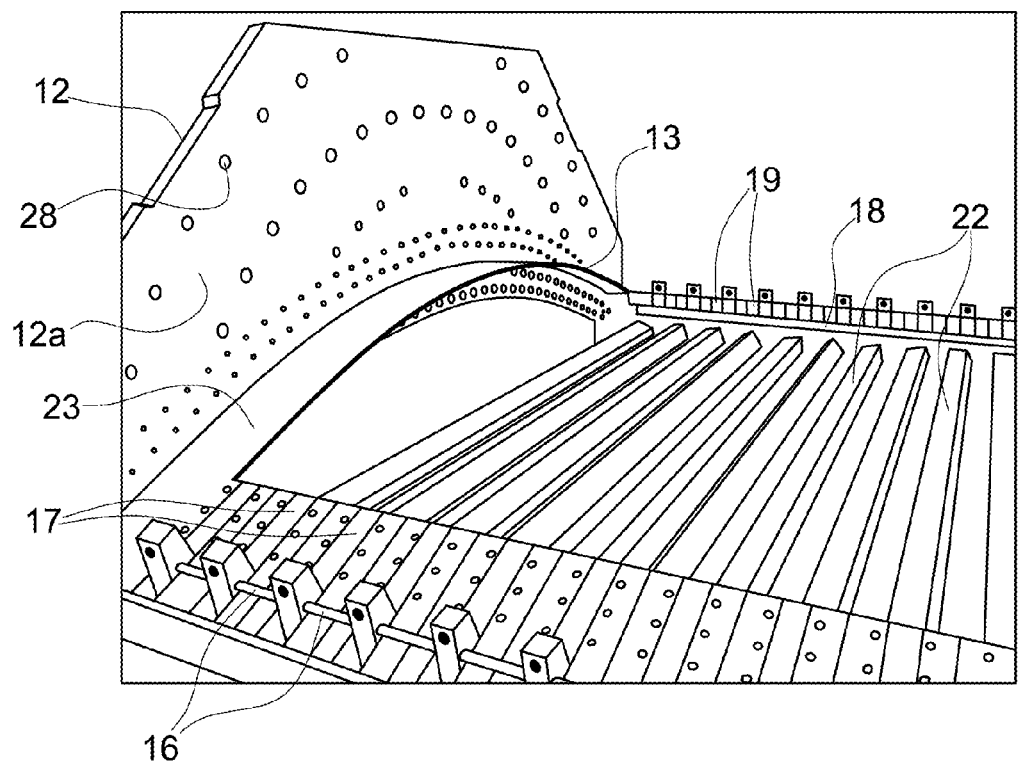
FIG. 2 is a perspective view of a detail of the device according to FIG. 1.

Two respective series of gripper-like members or claws 17, 19 are arranged along the bars 16, 18 and are each mounted so as to slide longitudinally along and rotate about the respective support bar. Each of these members consists of two claws or parts in a mirror arrangement, suitable for engaging with the two opposite sides of the panel. As shown in FIG. 2, each claw includes a block which is hinged about the associated bar and a blade-like portion which is applied against one of the two sides of the panel.

Respective arched (angular) profiles 13, 15 with an L-shaped cross-section are fixed onto the facing surfaces 12a, 14a of the transverse plates 12, 14 and each define a respective support surface 23, 25 for an edge zone of the "inner" side of the test panel. These surfaces have a given curvature which corresponds to that of the test panel and therefore of the fuselage part into which the panel must be incorporated.

Extending between the plates 12 and 14 in a continuous manner is a structure including a series of adjacent curved ribs 20 which are connected together in the longitudinal direction and are hermetically sealed so as to define, together with the transverse plates and the panel, a pressurizable chamber (not numbered). In this way it is possible to simulate the pressure gradients to which a fuselage panel is exposed during various flight, take-off or landing conditions. The ribs form as a whole a curved-wall structure with a concavity opposite to that of the curved surface of the panels to be tested. This rib structure has an elastic behaviour.

The opposite ends of the ribs are aligned longitudinally along two parallel straight lines situated in the vicinity of the bars 16, 18. A series of parallel and transverse stiffening rods 22 (FIG. 2) join together the opposite ends of the ribs. The rods 22 act as struts so as to limit the tendency of the ribs to be deformed in the transverse direction during the pressurization tests, which could result in the introduction of non-realistic stresses inside the fuselage panel.

The panel P to be tested is rested in the manner of a cover on the cradle structure of the device 10. The panel is laid so as to be substantially horizontal with its concavity directed downwards. The perimetral surfaces of the inner or concave side of the panel rest on the blade-like portions of the bottom claws of the gripper-like retaining members and on the cylindrical surfaces 23, 25 of the arched angular profiles 13, 15.

It will be noted that the various means (gripping claws, angular elements) for restraining the panel P are arranged around the opening of the pressurizable chamber, along the perimeter of a cylindrical surface segment, so as to retain the edges of the panel such that the latter closes the chamber.

Figure 4:
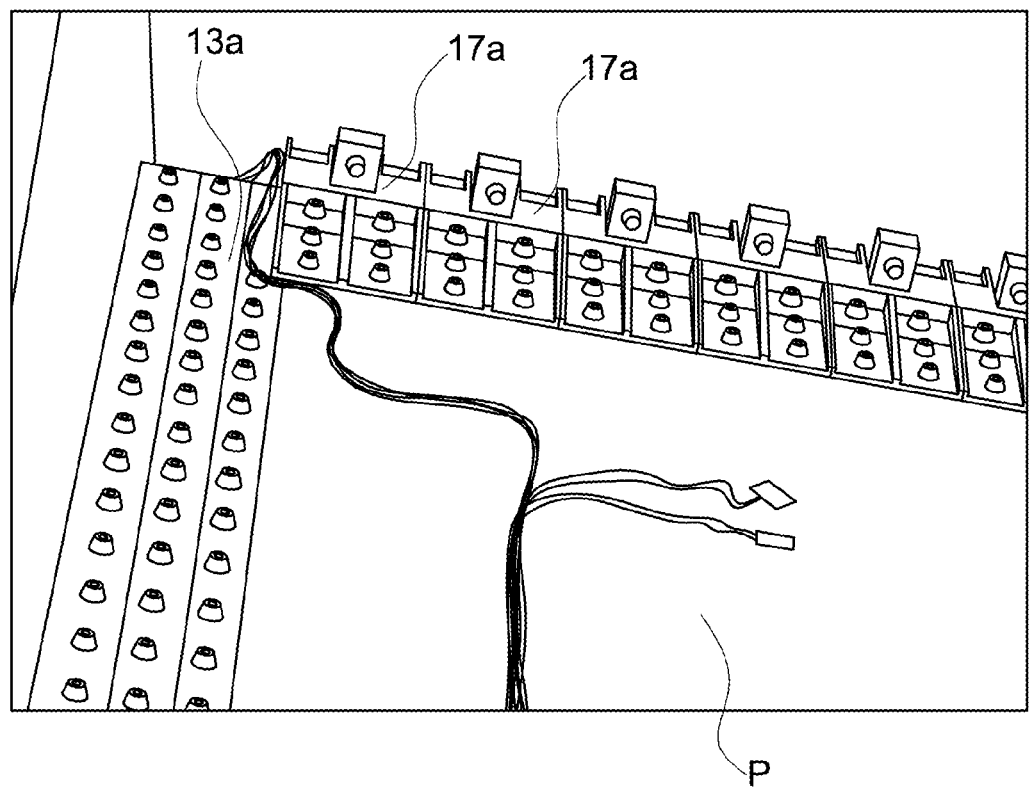
FIG. 4 is a perspective view of part of a fuselage panel clamped in position by retaining members of the device according to FIG. 1.

Then the panel is clamped perimetrally from above by means of further retaining members (FIG. 4) which match the bottom members. These upper retaining members include the upper claws 17a of the gripper-like retaining members and a pair of arched L-shaped profiles 13a which have cylindrical surfaces with concavities coinciding with those of the "inner" profiles 13, 15. These upper or outer profiles are bolted to the plates 12, 14 so as to grip in sandwich form the perimetral edges of the panel in a substantially continuous and uniform manner. The curvature of the pairs of arched profiles is preferably chosen so as to follow the curvature of the fuselage panel.

Figure 3:
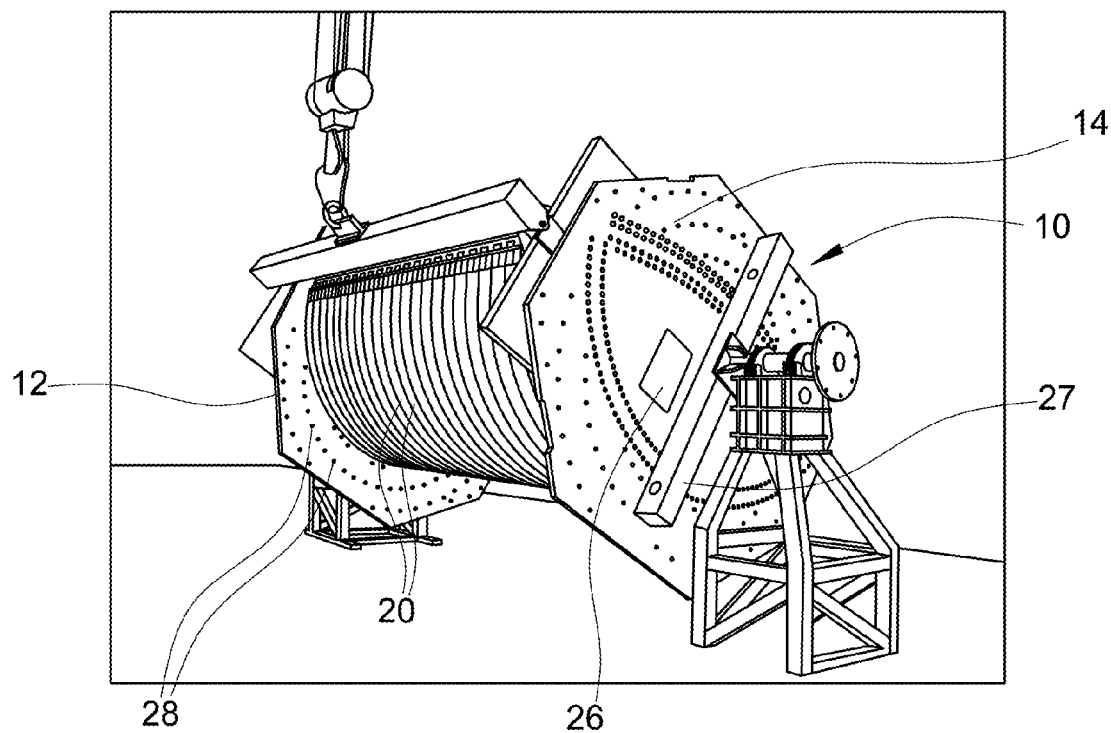
FIG. 3 is a perspective view of the device according to FIG. 1.

One of the transverse plates 14 (FIG. 3) is provided with a first opening 26 for allowing the passage of pressurized-air supply pipes and electric cables for transferring data and powering measurement devices such as strain gauges and/or other transducers which are applied to the panel in order to monitor its deformation in response to the loads transmitted to them. A second opening 27 allows an operator to access the inside of the chamber in order to inspect the panel and the measurement instruments without having to remove the panel from the device 10. These openings are provided with hermetically sealed closures. The measurement instruments, the associated wiring, as well as the pressurised-air supply pumps and associated supply ducts are not shown because they are not essential for an understanding of the invention.

The device 10 with the panel clamped on it must then be linked to an external load machine 30 (not shown) capable of imparting to the panel multi-axial loads with simple stresses or combined shearing, torsional, compressive or tensile stresses. The compressive or tensile stresses are imparted by moving the plates 12 and 14 towards or away from each other in longitudinal directions. The shearing and/or torsional forces are transmitted to the panel by raising or lowering vertically one of the plates relative to the other one. The torsional force is instead applied by rotating one of the two plates about a longitudinal axis. The plates 12, 14 have seats or fixing means such as through-holes 28 for the connection to the actuator members (not shown) of the load machine.

The loads applied by the load machine are partly transmitted to the retaining device 10. The rib-like structure 20 is designed with dimensions so as to have an elastic behaviour such that, when under load, it provides an additional resistance equal to that of the remaining wall of the fuselage, i.e. of the fuselage part complementing the panel being tested. The deformation of the panel being tested is rendered realistic also owing to the fact that the gripper-like members which grip the longitudinal edges of the panel are rotatable and slidable along the respective bars about which they are hinged. As a result of this constrained condition, the panel is able to swell, twist, flex, curve, bulge, etc., while simulating the restrained condition resulting from the circumferential continuity of the fuselage in a complete barrel, i.e. extending over 360°. By way of an indication the panels to be used in the apparatus of the present invention each define an arc of angular extension which preferably ranges between 60° and 90°. In other words, when loads are applied by the external load machine and/or by the overpressure inside the internal chamber, the device 10 simulates the deformation of the remainder of the fuselage. The ribs are preferably curved in order to avoid the presence of angular zones and therefore any weak points.

What is claimed is:

1. Apparatus for testing fuselage panels having the form of a cylindrical surface segment, comprising:
    a plurality of restraining means arranged along the perimeter of a cylindrical surface segment, for retaining the edges of a fuselage panel;
    a pressurizable chamber having an opening defined by said restraining means and closable by the fuselage panel retained by the restraining means; wherein the pressurizable chamber comprises a curved-wall structure having a concavity opposite the concavity of said cylindrical surface segment and having an elastic behavior configured such that, when under load, the curved-wall structure provides an additional resistance equal to that of a remaining wall of a fuselage, wherein the curved-wall structure is formed by a plurality of rib-like curved members arranged side by side in the longitudinal direction and hermetically connected together;
    the plurality of restraining means comprising:
        first and second restraining means arranged along two parallel arcs spaced from one another in a given longitudinal direction and lying on said cylindrical surface, for retaining two respective opposite arched edge portions of the fuselage panel;
        third and fourth restraining means arranged along two longitudinal straight lines spaced from one another and each joining a respective first point on one of the two arcs with a respective second point on the other of the two arcs;
        wherein the third and fourth restraining means include gripper-like retaining members mounted longitudinally slidably along a respective longitudinal support bar; and
        wherein each gripper-like retaining member is slidable along the respective bar independently of the other gripper-like retaining members and at least some of the gripper-like retaining members are mounted freely rotatably about the respective support bar.

2. Apparatus according to claim 1, further comprising first and second vertical, parallel and longitudinally opposite plates supporting the first and second restraining means, respectively.

3. Apparatus according to claim 2, wherein each plate at least partially defines a respective inner surface of the pressurizable chamber.

4. Apparatus according to claim 2, wherein the first and second restraining means comprise respective pairs of cylindrical surfaces longitudinally protruding from said first and second plates to clamp, between each pair, an edge zone of the panel.

5. Apparatus according to claim 4, wherein one of said first and second plates has two hermetically closable openings.

6. Apparatus according to claim 1, comprising stiffening rods within the pressurizable chamber.

7. Apparatus according to claim 1, wherein opposite ends of at least some of the rib-like members are joined by parallel and transverse stiffening.

8. Apparatus according to claim 1, wherein the rib-like members have a continuous curvature.

* * * * *